(12) United States Patent  (10) Patent No.: US 8,675,561 B2
Sun et al.  (45) Date of Patent: Mar. 18, 2014

(54) WIFI DISTANCE MEASUREMENT USING LOCATION PACKETS

(75) Inventors: Qinfang Sun, Cupertino, CA (US); Hao Zhou, Mountain View, CA (US); Hao-Jen Cheng, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 13/239,332

(22) Filed: Sep. 21, 2011

(65) Prior Publication Data

US 2013/0070607 A1 Mar. 21, 2013

(51) Int. Cl.
*H04Q 7/00* (2006.01)

(52) U.S. Cl.
USPC .......................... 370/328; 370/329; 370/331

(58) Field of Classification Search
USPC .......................................... 370/328, 329, 331
See application file for complete search history.

(56) References Cited

U.S. PATENT DOCUMENTS

| | | | |
|---|---|---|---|
| 5,612,703 A * | 3/1997 | Mallinckrodt | 342/457 |
| 5,878,034 A * | 3/1999 | Hershey et al. | 370/321 |
| 7,620,404 B2 * | 11/2009 | Chesnais et al. | 455/456.1 |
| 7,899,472 B1 | 3/2011 | Wang | |
| 2002/0118723 A1 | 8/2002 | McCrady et al. | |
| 2004/0249939 A1 * | 12/2004 | Amini et al. | 709/225 |
| 2006/0050625 A1 * | 3/2006 | Krasner | 370/208 |
| 2007/0150444 A1 * | 6/2007 | Chesnais et al. | 707/3 |
| 2007/0176749 A1 | 8/2007 | Boyd | |
| 2007/0189184 A1 * | 8/2007 | Ryu et al. | 370/252 |
| 2010/0150117 A1 | 6/2010 | Aweya et al. | |
| 2011/0243145 A1 * | 10/2011 | Ryu et al. | 370/400 |

OTHER PUBLICATIONS

Gunther, Andre, et al. "Measuring Round Trip Times to Determine the Distance between WLAN Nodes", In Proc. of Networking 2005, Waterloo, Canada, May 2005, pp. 1-12.
Kaplan, Elliott D., ed. "Understanding GPS: Principles and Applications", Artech House: Boston 1996, pp. 144-145.
International Search Report and Written Opinion—PCT/US2012/056428—ISA/EPO—Dec. 20, 2012.

* cited by examiner

*Primary Examiner* — Chuong T Ho
(74) *Attorney, Agent, or Firm* — Bever, Hoffman & Harms, LLP

(57) ABSTRACT

A method of determining a distance between a first wireless device and a second wireless device is provided. In this method, a location symbol can be generated by filtering and modulating a pseudorandom (PRN) code. The location symbol can be provided in a data field of a legacy wireless packet to form a first location packet. The first location packet can be transmitted from the first wireless device to the second wireless device. A second location packet can be transmitted from the second wireless device to the first wireless device, wherein the second location packet is substantially identical to the first location packet. An effective roundtrip time between the first and second wireless devices can be determined based on the first and second location packets. The distance between the first and second wireless devices can be computed using this roundtrip time.

26 Claims, 13 Drawing Sheets

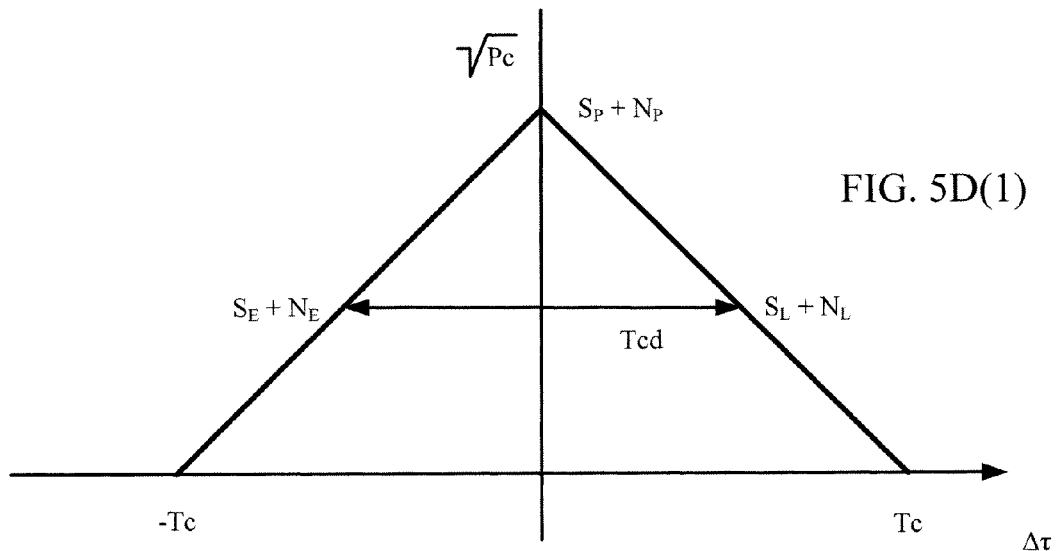
FIG. 5D(1)
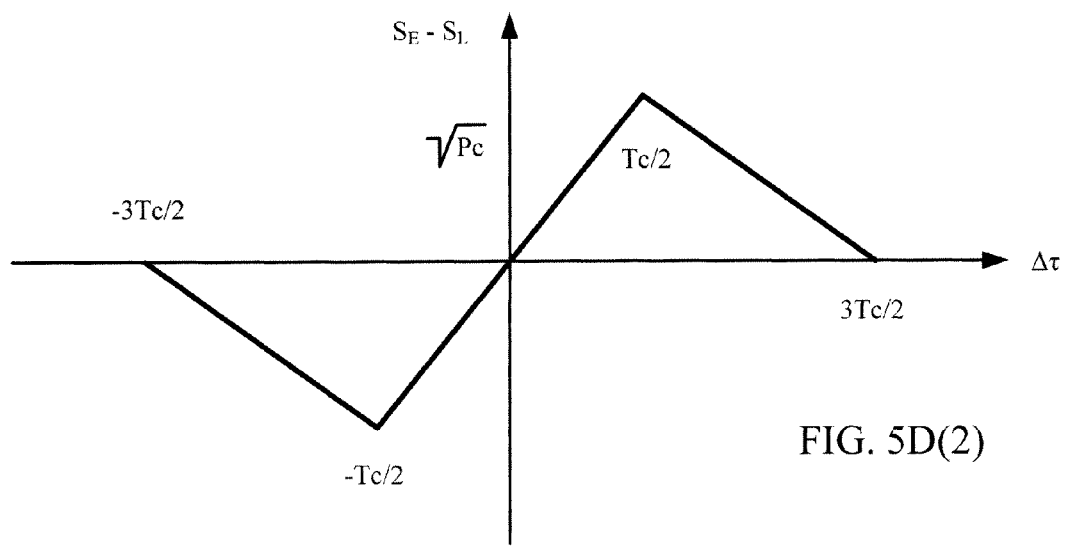
FIG. 5D(2)

WIFI DISTANCE MEASUREMENT USING LOCATION PACKETS

BACKGROUND OF THE INVENTION

1. Field of the Invention

The present invention relates to distance measurement using radio frequency (RF) signals and in particular to incorporating a location symbol into the DATA field of a legacy packet, thereby facilitating refined distance measurement to within one meter.

2. Related Art

Wireless local area networking (WLAN) technologies based on the IEEE 802.11 set of standards transmit data packets via air. Determining the distance between nodes in a WLAN can be done by computing a round trip time of packets sent between the nodes and then determining air propagation time. An article authored by Andre Gunther and Christian Hoene, entitled "Measuring Round Trip Times to Determined the Distance between WLAN Nodes", published in 2005 describes such a computation using a data/acknowledgement sequence in detail. This type of conventional round trip computation can provide distance accuracy within 8 meters.

U.S. Pat. No. 7,899,472, issued to Atheros Communications on Mar. 1, 2011 and incorporated by reference herein, describes other techniques that can be used to determine distance and position. For example, when associated with a WLAN, a wireless device can quickly determine its position based on information provided by an access point in the WLAN. Even when a wireless device disassociates with the access point, the WLAN can provide time, location, and decoded GPS data to the station before its disassociation. In this manner, the wireless device can significantly reduce the time to acquire the necessary GPS satellite data (i.e. on the order of seconds instead of minutes) to determine its coordinate position.

This technique can include identifying a first access point having a first known location and a predetermined radio propagation range of r. The position of a wireless device, which is capable of associating with the access point, is the first known location with an uncertainty of r. In this manner, even the relative position of the wireless device is within an acceptable range of accuracy for emergency service.

To further refine this relative position, the technique can further include determining a radio signal strength indicator (RSSI) of the access point. The RSSI can be correlated to a distance, which could be stored in a lookup table (LUT) in the wireless device. The stored distance represents a more accurate relative distance from the access point to the wireless device.

To obtain a coordinate position (x0, y0, z0) of the wireless device, the wireless device can receive information from additional access points. Specifically, the wireless device can identify second and third access points, each having known locations. The wireless device can then determine second and third RSSIs of the second and the third access points, respectively. The second and third RSSIs can be correlated to second and third stored distances. The second stored distance represents a second relative distance from the second access point to the wireless device, whereas the third stored distance represents a third relative distance from the third access point to the wireless device. At this point, the wireless device can compute its coordinate position using the first, second, and third known positions and the first, second, and third relative distances.

In yet another technique, the use of multiple antennas within an access point can also facilitate quickly and accurately providing a coordinate position of the wireless device. In this technique, the wireless device can determine an RSSI associated with each of the multiple antennas. The signal path of the antenna associated with a highest RSSI can be identified. Once again, the highest RSSI can be correlated to a stored distance, wherein the stored distance represents a relative distance from the access point to the wireless device. At this point, the wireless device can use the angles associated with the signal path and the relative distance to compute a coordinate position of the wireless device.

In general, the techniques described in U.S. Pat. No. 7,899,472 can provide distance/position information with an accuracy of 2-3 meters. However, a need arises for even greater accuracy, i.e. within one meter.

SUMMARY OF THE INVENTION

A method of determining a distance between a first wireless device and a second wireless device is provided. In this method, a location symbol can be generated by filtering and modulating a pseudorandom (PRN) code. The location symbol can be provided in a DATA field of a legacy wireless packet to form a first location packet. The first location packet can then be transmitted from the first wireless device to the second wireless device. A second location packet can be transmitted from the second wireless device to the first wireless device, wherein the second location packet is substantially identical to the first location packet. An effective roundtrip time between the first and second wireless devices can be determined based on the first and second location packets. The distance between the first and second wireless devices can be computed using this effective roundtrip time.

In one embodiment, the method can further include generating the PRN code, for example by using a maximum length shift register (MLSR). The PRN code can be a GPS 1023 chip code, an m-sequence 127 chip code, or some other chip code having a well-defined autocorrelation function. Notably, the location packet has a power spectrum substantially within a predetermined transmit spectral mask. An exemplary transmit spectral mask is for a 40 MHz channel, i.e. an IEEE 802.11n-compliant channel.

The method can further include specifying a protocol for the first and second wireless devices. In one embodiment, the protocol can provide that one predetermined bit of a signal field of the legacy packet indicates the data field includes the location symbol. In another embodiment, the protocol can provide that one or more predetermined bits of the DATA field indicate that the DATA field also includes the location symbol.

A transceiver in a first wireless device for determining a distance between the first wireless device and a second wireless device is also provided. The transceiver can include a transmitter, an antenna, and a receiver. The transmitter can include a first transmitting portion for filtering and modulating a pseudorandom (PRN) code to form a location symbol. The transmitter can also include a second transmitting portion for providing the location symbol in a DATA field of a legacy wireless packet to form a first location packet. The antenna can transmit the first location packet to the second wireless device.

The antenna can receive a second location packet from the second wireless device. This second location packet is substantially identical to the first location packet. The receiver can include a first receiving portion for separating the location symbol from the second location packet. The receiver can also include a second receiving portion for filtering and demodulating of the location symbol, and tracking of the PRN code within the location symbol. The receiver can also include a processor configured to determine an effective roundtrip time between the first and second wireless devices based on the first and second location packets using outputs of the second receiving portion, as well as compute the distance between the first and second wireless devices using the effective roundtrip time.

In one embodiment, the first transmitting portion can further include a PRN code generator. This PRN code generator can generate a GPS 1023 chip code or an m-sequence 127 chip code. The first transmitting portion can include a low pass filter for the filtering of the PRN code. The first transmitting portion can also include a modulator for modulating an output of the low pass filter onto a 5 GHz carrier to form the location symbol. In one embodiment, instead of filtering the PRN code, the first transmitting portion can access a pre-calculated filtered code sequence based on the PRN code and modulate the pre-calculated filtered code sequence to form the location symbol.

The second receiving portion can include a bandpass filter for filtering the location symbol. The second receiving portion can also include a demodulator for demodulating an output of the bandpass filter with a 5 GHz carrier downconverter signal. The second receiving portion can also include a PRN mixer for extracting the PRN code from an output of the demodulator.

The second receiving portion can include a correlator dump block for receiving the PRN code and generating N (noise), E (early), P (prompt), and L (late) correlation results for use in code and frequency tracking. The second receiving portion can also include a code and frequency tracking block for receiving an output of the correlator dump block and providing outputs to the PRN mixer and a carrier removal block. In one embodiment, the code and frequency tracking block can perform multiple iterations within at least one epoch period of the PRN code.

BRIEF DESCRIPTION OF THE FIGURES

FIGS. 5D(1) and 5D(2) illustrate exemplary correlation results.

DETAILED DESCRIPTION OF THE FIGURES

The IEEE 802.11 set of standards implements wireless local area networks (WLANs) operating in the 2.4, 3.6, and 5 GHz frequency bands. The use of multiple-input multiple-output (MIMO) antennas was introduced in the 802.11n standard to facilitate significant increases in data throughput without additional bandwidth or transmit power. The 802.11n standard uses 40 MHz bandwidth channels in the 2.4 GHz band.

Figure 1:
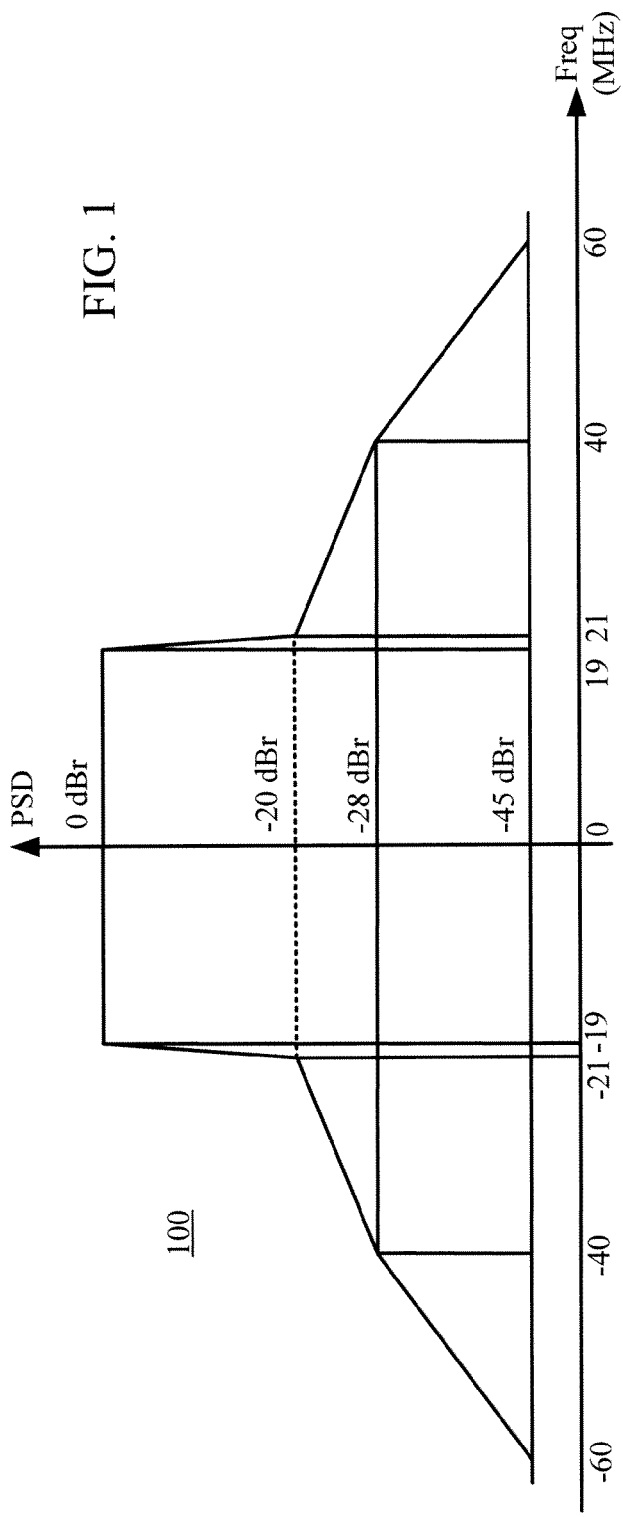
FIG. 1 illustrates a power spread density (PSD) 100 for a 40 MHz channel (also called a WIFI spectral mask).

In addition to specifying the center frequency of each channel, the 802.11 set of standards indicates a spectral mask defining the permitted distribution of power across each channel. FIG. 1 illustrates a power spread density (PSD) 100 for a 40 MHz channel (as promulgated in the 802.11n standard). PSD 100 defines first power output restrictions up to ±19 MHz from the center frequency to be attenuated by −45 dBr as well as second power output restrictions from ±19-60 MHz from the center frequency to be attenuated between −20 dBr to −45 dBr.

Figure 2:
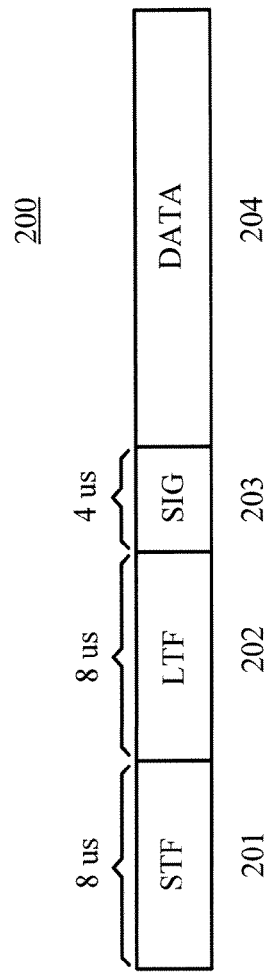
FIG. 2 illustrates a legacy mode frame format for an 802.11n WLAN signal.

FIG. 2 illustrates a legacy mode frame format 200 for an 802.11n WLAN packet (also called a wireless fidelity (WIFI) signal). Format 200 includes a short training field (STF) 201, a long training field (LTF) 202, a SIGNAL field (SIG) 203, and a data (DATA) field 204. Both STF 201 and LTF 202 have a length of 8 us (2 OFDM symbols), whereas SIG field 203 has a length of 4 us (1 OFDM symbol). DATA 204 varies in length. STF 201 and LTF 202, which are well known in the art of WLAN communication, can be used to provide time and frequency synchronization. SIG field 203 includes predetermined bits for indicating length, parity, and receiver processing functions. DATA field 204 includes the data, bits for other receiver processing functions, and pad bits to ensure the total size equals a specific multiple of bits coded in an OFDM symbol.

The 802.11n standard uses orthogonal frequency division multiplexing (OFDM) modulation. OFDM divides data into several parallel data streams or channels, one for each sub-carrier. Each sub-carrier is modulated using quadrature amplitude modulation (QAM) or phase-shift keying (PSK). The sub-carrier frequencies are chosen to be orthogonal to each other.

In accordance with one aspect of the invention, a location symbol can be inserted in DATA field 204 in lieu of actual data for transmission. In other words, a specific legacy packet can be sent including the location symbol. The legacy packet including the location symbol is called a location packet herein. This replacement in the standard legacy format can be captured in the protocol, thereby ensuring that transceivers can leverage this enhanced distance measurement tool. For example, in one embodiment, the protocol may specify that one predetermined bit of SIG field 203 may indicate that a location symbol is in DATA field 204. In another preferred embodiment, the protocol may specify that one or more predetermined bits of DATA field 204 may indicate that the remainder of the field includes the location symbol. As described in greater detail below, this location symbol can facilitate significant refinement of round-trip time compared to conventional techniques, thereby ensuring more accurate positioning information.

Direct sequence spread spectrum (DSSS) is a modulation technique that multiplies the data being transmitted with a string of pseudorandom (PRN) code values (i.e. 1 and −1 values) called chips, wherein each chip has a much shorter duration than an information bit. Therefore, the chip rate is significantly faster than the information signal bit rate. In DSSS, the receiver knows the PRN sequence used by the transmitter, thereby allowing the receiver to reconstruct the information signal in a de-spreading operation. In one preferred embodiment, the "data" being transmitted can be a single value (e.g. a "1"), thereby simplifying correlation and tracking. In other words, the information transmitted in the DATA field substantially represents the PRN code.

In one embodiment, the chip sequence for GPS is used for the location symbol. Specifically, the GPS coarse acquisition (C/A) code (also called the GPS gold code in the industry) is 1023 chips, with a total chip sequence lasting 1 ms. Therefore, the chip code rate is 1.023 Mbps.

Figure 3:
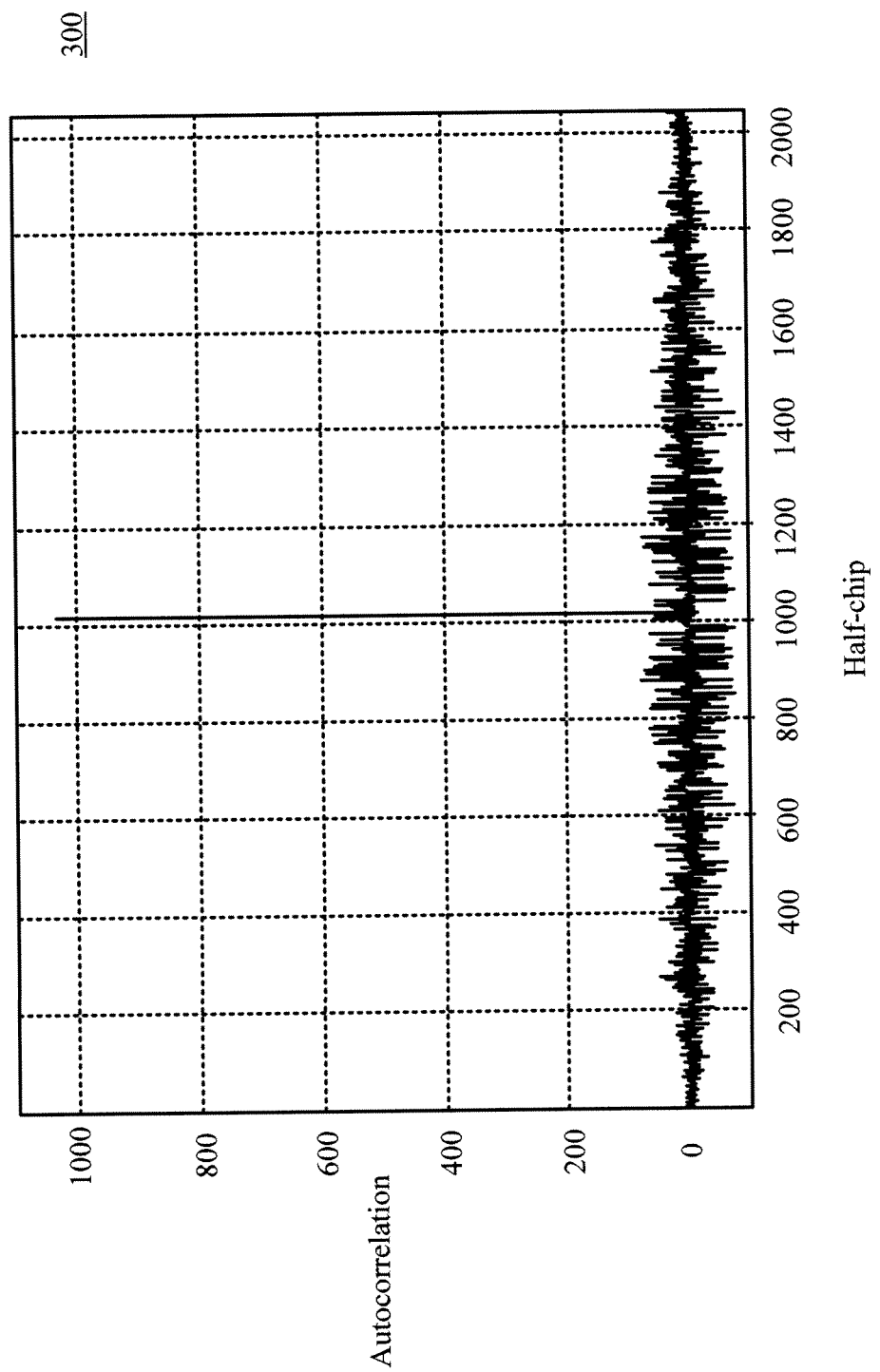
FIG. 3 illustrates the autocorrelation function of the GPS gold code for satellite 1.

To fully utilize the WIFI channel bandwidth, the chip rate can be set to 10.23 Mbps. Thus, one code sequence can last for 100 us. The generated PRN code can be low-pass filtered to conform to the 40 MHz transmit spectral mask shown in FIG. 1 and then modulated onto a 5 GHz carrier for transmission. The filtered and modulated PRN code forms the location symbol. FIG. 3 illustrates the autocorrelation function 300 of the GPS gold code for satellite 1. As indicated by the sharp peak at chip 1023, autocorrelation function 300 indicates an accurate correlation function can be performed when a location symbol with the 1023 GPS gold code is used.

Figure 4:
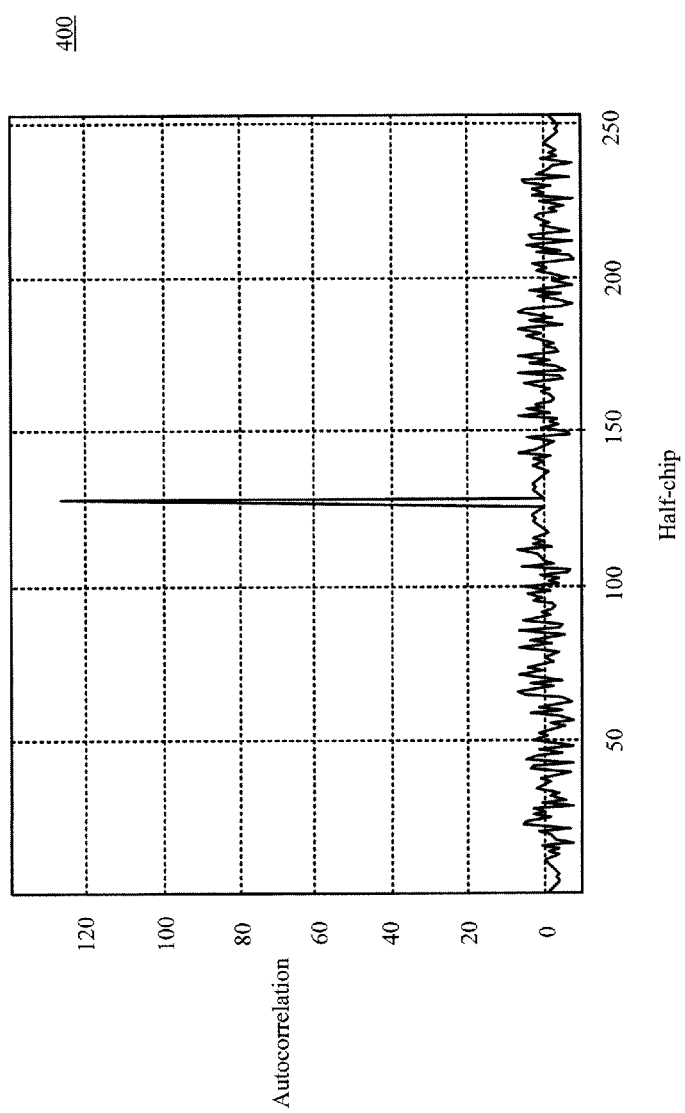
FIG. 4 illustrates an autocorrelation function of a 127 chip m-sequence code.

In another embodiment, a shorter m-sequence PRN code for the location symbol can be used. For example, one shorter m-sequence can have 127 chips. In one implementation, the 127 chips can be generated by a maximum length shift register (MLSR) having seven stages (e.g. 7 D flip-flops serially connected with flops 7, 6, 5, and 4 having taps providing inputs to an XOR gate, which in turn provides a feedback to flop 1. Note that an MLSR is well known to those skilled in the art and therefore is not described in detail herein. The XOR gate loops through all possible $2^7$ states (128) except the all-zero state, thereby yielding a periodicity of 127 (128−1=127) chips. These 127 chips have a chip rate of 12.7 Mpbs. Therefore, this m-sequence lasts for 10 us, which is 10 times shorter than the above-described 1023 GPS chip embodiment. The m-sequence generated PRN signal can also be low-pass filtered to conform to the 40 MHz transmit spectral mask (FIG. 1) and then modulated onto the 5 GHz carrier for transmission. FIG. 4 illustrates an autocorrelation function 400 of the 127 chip m-sequence code (e.g. using the 7 stage MLSR and taps). As indicated by the sharp peak at chip 127, autocorrelation function 400 also indicates an accurate correlation function can be performed when a location symbol with the 127 m-sequence code is used.

Thus, both the 1023 chip embodiment and the 127 chip embodiment can provide well-defined correlation functionality for de-spreading. Note that the chip duration, which determines the accuracy of the distance computation, is the inverse of the chip rate (i.e. 1/10.23=0.09775 for the 1023 GPS chip embodiment, and 1/12.7=0.07874 for the 127 m-sequence chip embodiment). Thus, the accuracy of the 1023 chip embodiment is comparable to that of the 127 chip embodiment (i.e. approximately 10 MHz for each). However, between the 1023 chip embodiment and the 127 chip embodiment, the 127 chip embodiment is generally preferred because a shorter packet minimizes transmit and processing time.

In yet other embodiments, a Barker code (11 chip) or a long training sequence can be used as the PRN code. However, both of these PRN codes have strong side lobes, which could result in false peaks. Additionally, the long training sequence may require multipliers and other functions to generate the PRN code locally for time domain correlation. Therefore, in general, the ease of determining the correlation peak, the accuracy, the packet length, and the implementation cost should be considered for specific applications.

Figure 5A:
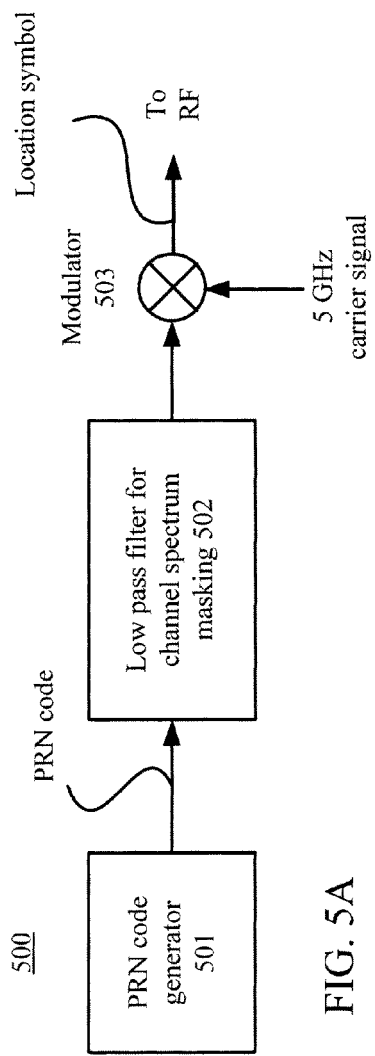
FIG. 5A illustrates a portion of an exemplary transmitter configured to generate the location packet.

FIG. 5A illustrates an exemplary transmitting portion 500 configured to generate the location symbol. In this embodiment, transmitting portion 500 includes a PRN code generator 501, a low pass filter 502 for channel spectrum masking the generated PRN code, and a modulator 503 for modulating the output of low pass filter 502 onto the 5 GHz carrier to form the location symbol suitable for inclusion into the DATA field. In one embodiment, low pass filter 502 can be implemented using a standard tool to define a specific frequency domain and response. In another preferred embodiment, the computations of PRN code generator 501 and low pass filter 502 can be simulated, wherein the simulation results (i.e. the resulting bit sequence) can be stored (e.g. in read only memory (ROM)) for use in the transmitter. Note that transmitting portion 500 is in addition to the transmit chains used for forming the MIMO signals.

The resulting location symbol output by modulator 503 can be converted to RF using standard components. As described above, PRN code generator can generate a 1023 chip code, an m-sequence (e.g. 127 chip) code, or some other suitable PRN code. In any case, for inclusion in the DATA field, the pure repetitive PRN code sequence can be used. That is, there is no data modulation performed on the PRN code.

Figure 6:
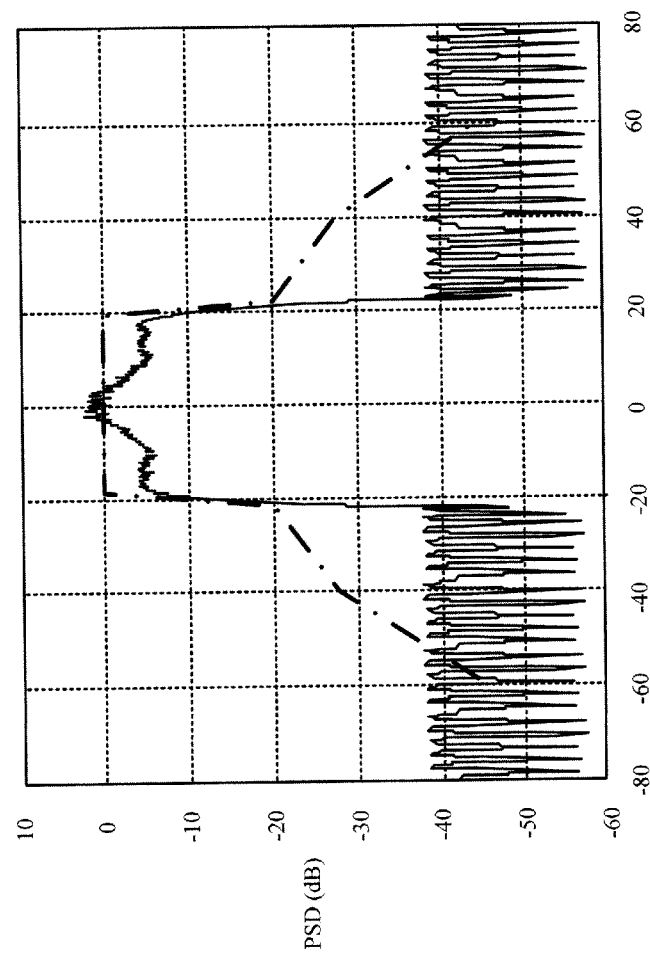
FIG. 6 illustrates an exemplary location packet spectrum.

FIG. 6 illustrates an exemplary location symbol transmit signal spectrum 600 (with noise). Note that the location symbol transmit signal spectrum 600 falls within and roughly follows the limits established by transmit spectral mask 100 (also called a WIFI spectral mask) shown in FIG. 1 (indicated for context in a bold, dash-dot line). Therefore, location symbol transmit signal spectrum 600 can be successfully shaped (i.e. by using low pass filter 502, FIG. 5A) to substantially follow the WIFI spectral mask, thereby ensuring the minimization of interference with neighboring channels.

Figure 5B:
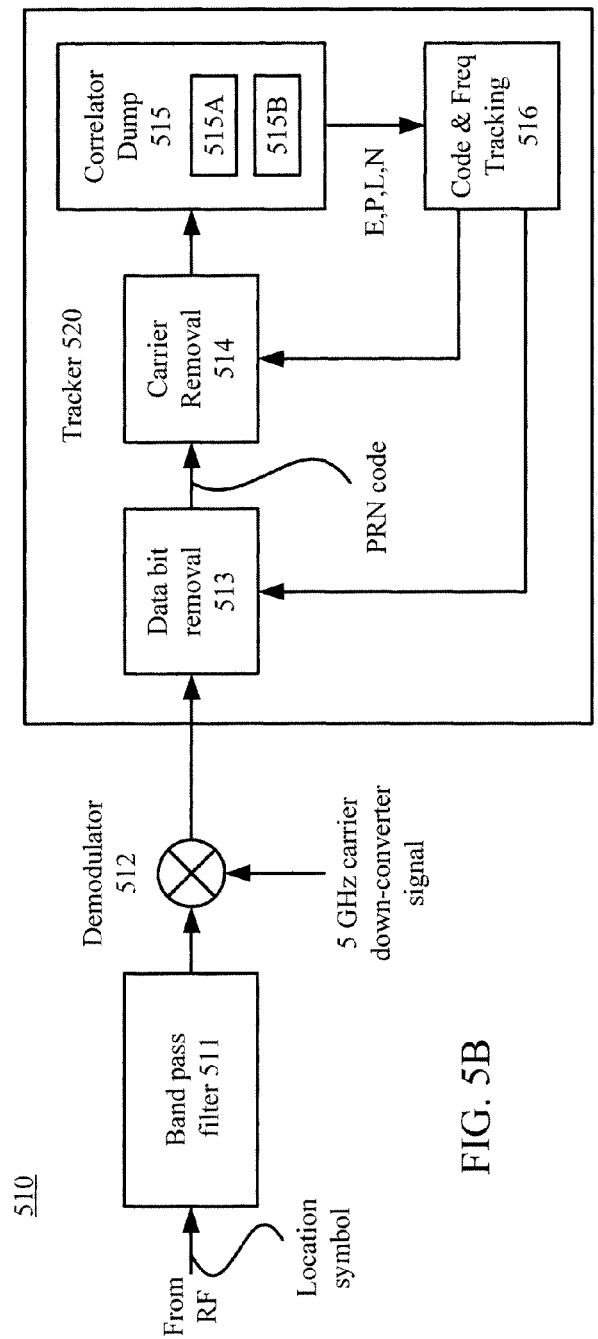
FIG. 5B illustrates a portion of an exemplary receiver for receiving the RF signal, which includes the location packet.

FIG. 5B illustrates an exemplary receiving portion 510 configured for receiving the RF (WIFI) signal including the location symbol. Note that receiving portion 510 is in addition to the receive chains used for processing the MIMO signals. In one embodiment, an analog front end (AFE) of the receiver can direct all information of the DATA field to receiving portion 510 (and not to a receive chain) when the SIG field indicates a location symbol is included in the WIFI signal. Alternatively, an analog front end (AFE) of the receiver can direct only part of the DATA field to receiving portion 510 (and not to a receive chain) when the preliminary bits of the DATA field indicate a location symbol is included in the WIFI signal. Receiving portion 510 can include a band pass filter 511 for passing frequencies within a predetermined, desired frequency range, a demodulator 512 for providing carrier down-conversion to a rough 5 kHz carrier frequency residual, and a tracker 520. In one embodiment, tracker 520 can sample the demodulated signal using a 160 MHz ADC (not shown for simplicity).

As noted above in reference to FIG. 2, STF 201 and LTF 202 can provide time and frequency synchronization for a legacy packet. However, some code phase offset in the PRN as well as frequency offset in the carrier frequency may result in imprecise time and frequency synchronization by tracker 520. For example, a phase-locked loop (PLL) at the transmitter may be off 10 us or more. As a result, LTF 202 may suffer from several kHz of frequency error. This amount of frequency error is not critical for the 4 us duration of a WiFi OFDM symbol, i.e. only several degrees in phase error over the OFDM symbol duration. However, this amount of remaining frequency error can jeopardize the de-spreading gain of the longer duration PRN. The configuration of tracker 520 can advantageously minimize this frequency error.

In one embodiment, tracker 520 can include a data bit removal block 513, a carrier removal block 514, a correlator dump block 515, and a code & frequency tracking block 516. Data bit removal block 513 can mix the demodulated signal with the "data" (e.g. all 1's which was provided to receiving portion 510 via another signal or input during initialization), thereby allowing retrieval of the PRN code. Carrier removal block 514 can perform residual carrier removal by multiplying with the sinusoidal tone, which corresponds to the residual carrier frequency.

In one embodiment, correlator dump block 515 can be configured to complete code correlation. Correlator dump block 515 can include a correlator 515A to confirm a PRN code is being received and if so, its timing. Correlator 515A can check the received signal against the specific PRN code that is being used. This specific PRN code can be stored in a memory 515B, thereby facilitating this checking operation.

To facilitate quick matching, correlator 515A can include a shift register. In this shift register, the chips are shifted in time by slewing the clock controlling the shift register. Thus, correlation of the PRN code and the received signal could take from 1 chip (best case) up to N chips, wherein N correspond to the total number of chips (e.g. 1023 chips when using the GPS gold code).

In one embodiment, a late version of the PRN code can be compared with an early version of the PRN code to ensure that the correlation peak is tracked. An exemplary tracker correlation for correlator dump block 515 can have 4 taps, i.e. N (noise), E (early), P (prompt), and L (late) taps. The different taps are generated by tapping out from different stages of a shift register delay line, which is fed by the output of the code generator. Thus, for each PRN code period (also called an epoch), there is one set of (N, E, P, L) correlation result output provided to code & frequency tracking block 516.

Figure 5C:
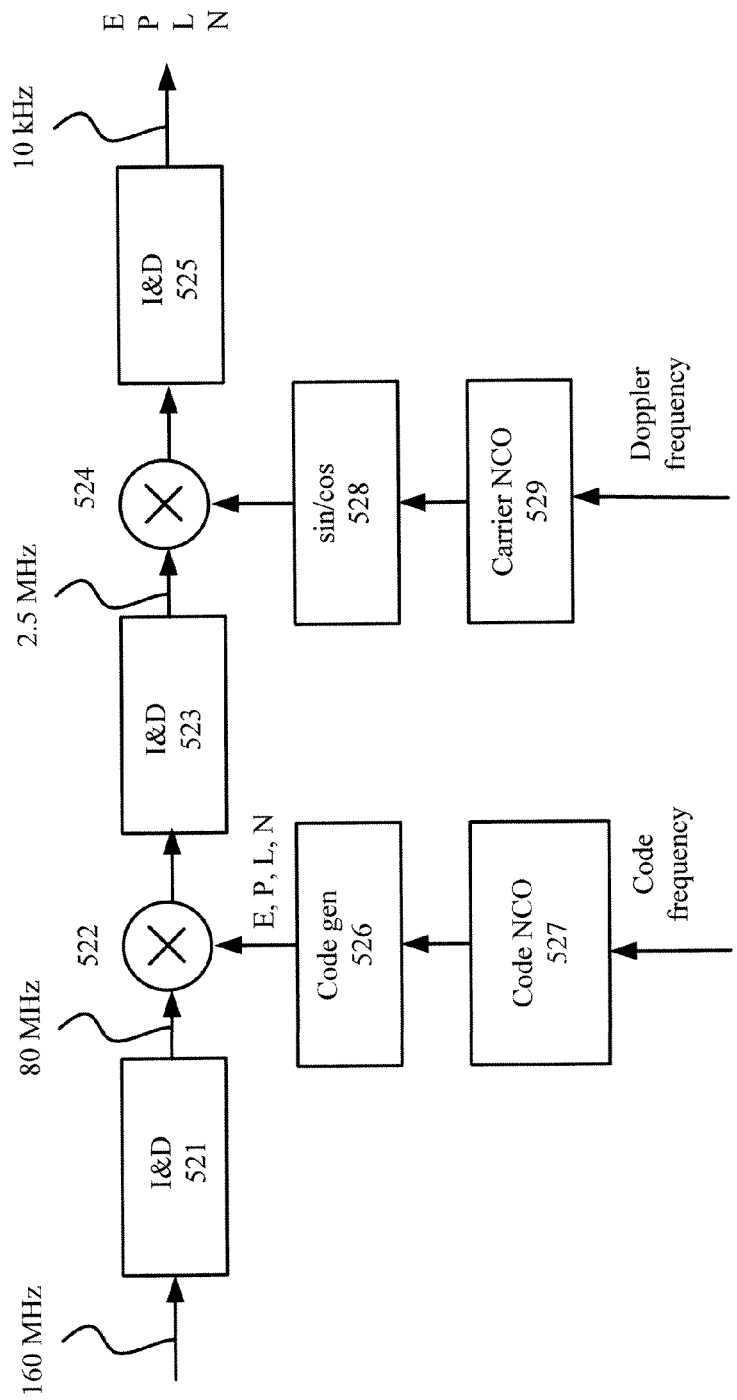
FIG. 5C illustrates an exemplary an exemplary code and frequency tracking block.

FIG. 5C illustrates an exemplary code and frequency tracking block 516 that includes an integrate and dump (I&D) block 521, a mixer 522, an I&D block 523, a mixer 524, and an I&D block 525, all coupled in series. A code NCO 527 (e.g. 32 bit) can provide its output to a code generator 526, which in turn provides its output to mixer 522. A carrier NCO 529 (e.g. 24 bit) can provide its output to a sin/cos table 528, which in turn provides its output to mixer 524. The results output by I&D block 525, i.e. E,P,L,N, can be used (by software) to provide tracking control, DLL, FLL, bit boundary determination, and data bit extraction. Note that software can provide a code frequency to code NCO 527 and a Doppler frequency to carrier NCO 529.

FIGS. 5D(1) and 5D(2) illustrate exemplary correlation results. As an ideal rectangular chip pulse shaping, the correlation results show as a triangular shape with a 2 Tc span (Tc is the chip duration). With zero code phase offset ($\Delta\tau=0$), the correlation reaches its peak value sqrt(Pc). Note that ($S_P+N_P$) is the prompt sample, and ($S_E+N_E$) and ($S_L+N_L$) are the early and late samples, respectively. $S_E$ and $S_L$ can be used to estimate the timing error, whereas $S_P$ can be used for carrier frequency tracking. The difference between $S_E$ and $S_L$ ($S_E-S_L$) indicates an offset of the correlation code phase. This code phase offset estimate passes through a loop filter to drive block 513 to fine track code phase. N tap, which is used to estimate the noise power, usually is placed outside the +−1 chip space, such that the signal power leakage at the N tap is negligible during tracking.

Code and frequency tracking block 516 can provide a multiplication and integration functionality that corresponds to the number of chips. That is, the multiplication and integration performed by code and frequency tracking block 516 completes the correlation of one pseudo-code, wherein N is the number of chips in one pseudo-code (e.g. 127 or 1023). Code and frequency tracking block 516 can generate loop updates to both data bit removal block 513 and carrier removal block 514.

Figure 5E:
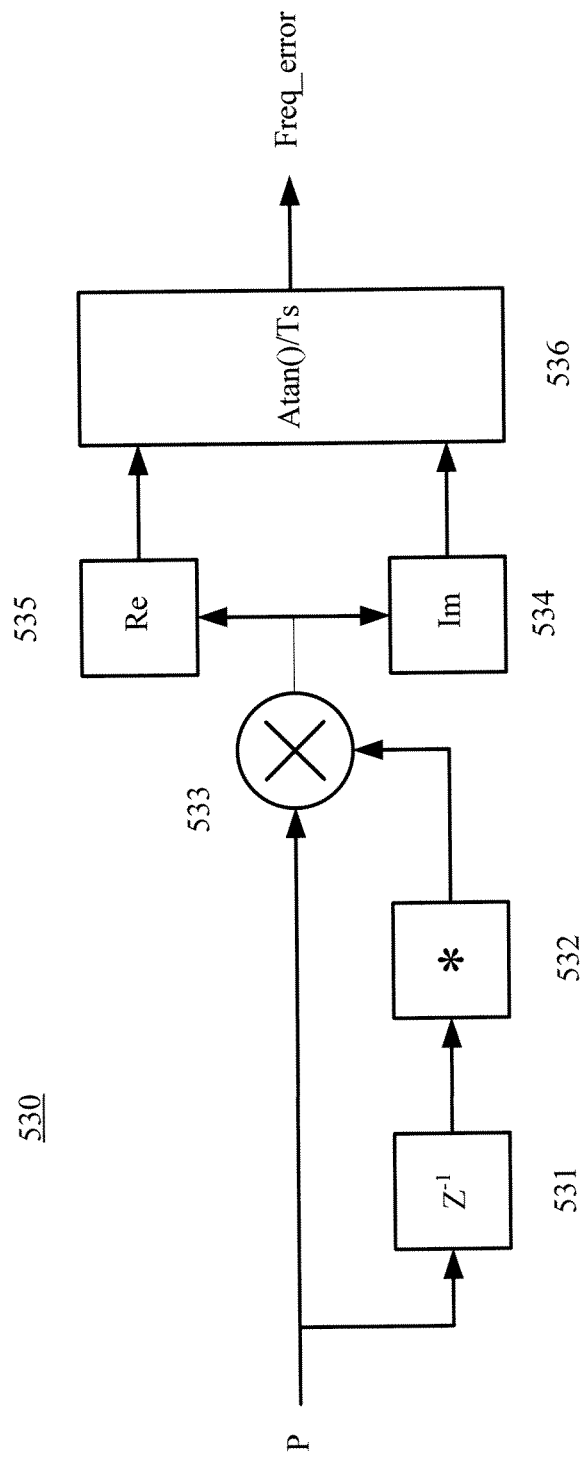
FIG. 5E illustrates an exemplary AFC discriminator.
Figure 5F:
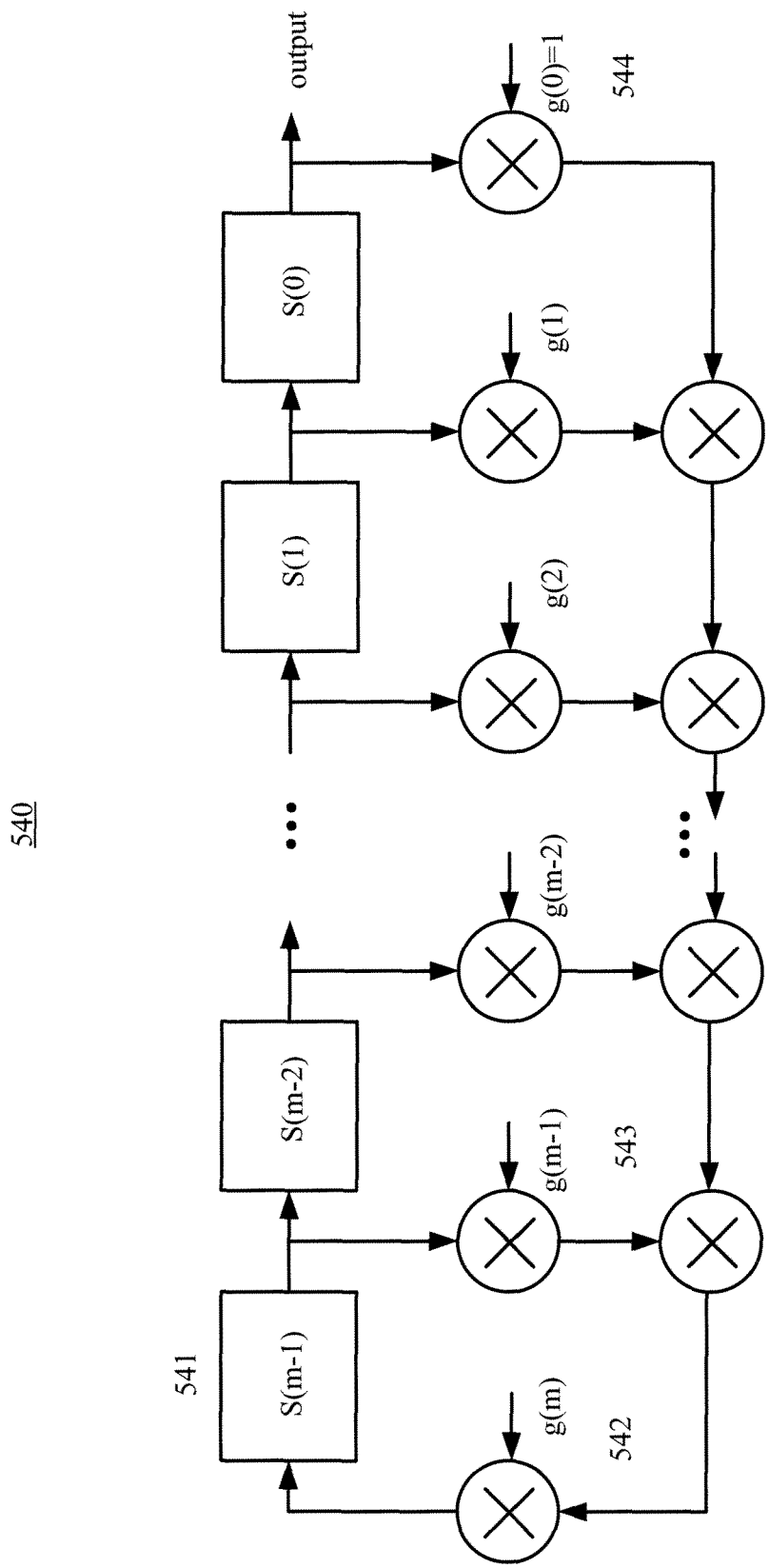
FIG. 5F illustrates the structure of the maximum length sequence (m-sequence).

In one embodiment, the carrier frequency tracking operations of code and frequency tracking block 516 can be implemented using an automatic frequency control (AFC). FIG. 5E illustrates an exemplary AFC discriminator 530. In one embodiment, AFC discriminator 530 uses the prompt (P) values of adjacent epochs (e.g. using end-point values) to estimate the residual frequency error (freq_error). Block 531 is a signal delay unit; it takes the correlator 'prompt' output as input signal. Block 532 continues to take the complex conjugate of the signal. Block 533 multiplies the input signal with the output of block 532. Block 534 and 535 take the imaginary and real parts of the output of block 533. Finally, the imaginary and real parts are used by block 536 A tan( )/Ts to compute the frequency estimate. Here, Ts is the pseudo code (epoch) duration. This residual carrier frequency, after passing through a loop filter (not shown), can be provided to carrier removal block 514 to further refine its operations. Note that code phase tracking can be implemented using a conventional DLL. FIG. 5F illustrates one typical structure of the m-sequence generator. As an example, g=[0 0 0 1 1 1 1] for m=7 setting provides a length-127 pseudo code in performance simulations.

Notably, the WIFI signal including the location symbol, i.e. the location packet, is a burst signal instead of a continuous signal as provided in GPS. Therefore, the location packet requires much faster pull-in capability compared to a GPS signal. Because the location packet is inherently a strong signal (e.g. −96 dBm and above, compared to a typical GPS signal, which is −130 dBm or below), an iterative algorithm can be carried out to fully leverage the information inside each DSSS epoch signal. Specifically, iterations using one bit of the signal can be performed, thereby resulting in significantly faster code phase error correction compared to waiting for the next bit before making any correction.

For example, the code phase estimation can be refined iteratively using an ($|E|=|L|$) tracking criterion in one epoch period. Specifically, in iteration i, the estimated code phase (theta(i)) to drive the local PRN numerically controlled oscillator (NCO) can be used to generate the E(i), P(i), and L(i). These values can be used to compute a dot-product discriminator output (d_theta(i)). An exemplary dot-product discriminator is described in "Understanding GPS—Principles and Applications, page 144, published in 1996. The discriminator output can be expressed as:

$$d\_theta = (Im(S_E) - Im(S_L)) \times Im(S_P) + (Re(S_E) - Re(S_L)) \times Re(S_P)$$

where "Im" refers to an imaginary value, "Re" refers to a real value, "S" refers to correlator output, "E" refers to early, "L" refers to late, and "P" refers to prompt. The discriminator output (d_theta(i)) can be used to adjust the estimated code phase (theta(i)) to obtain a new estimated value theta(i+1) for the next iteration. After several iterations, an accurate code phase estimate can be achieved for that epoch.

Figure 7:
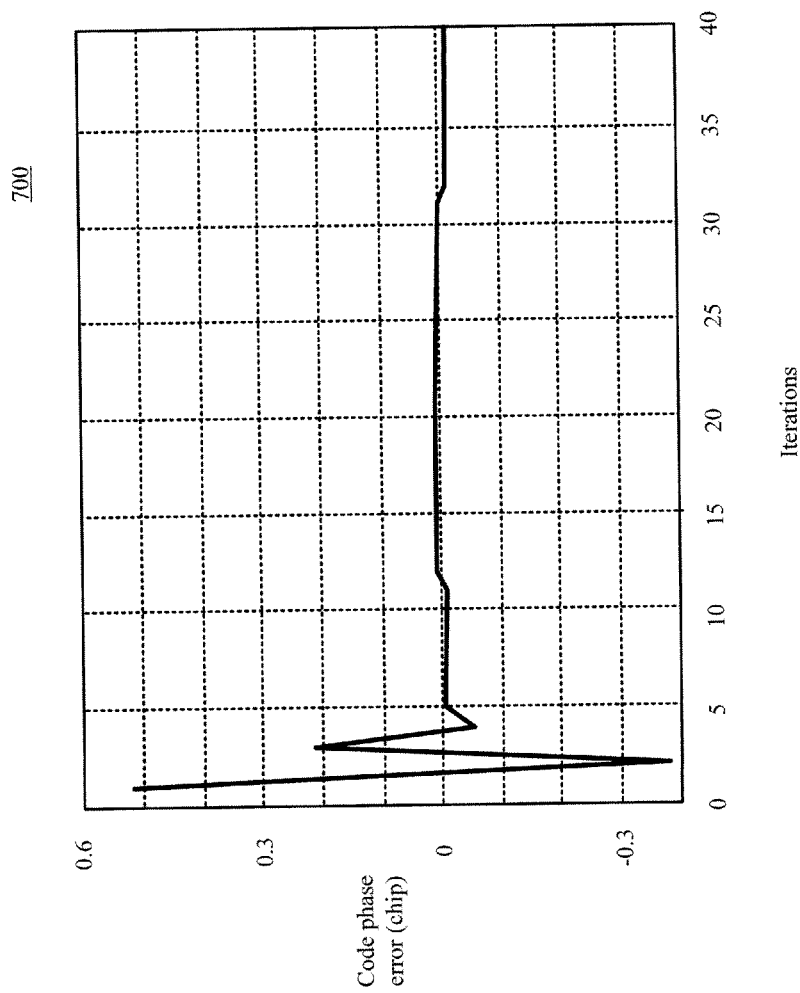
FIG. 7 illustrates a graph plotting code phase error versus iterations, i.e. the pull-in and track behavior, using an exemplary iteration algorithm for a typical location packet.

FIG. 7 illustrates a graph 700 plotting code phase error versus iterations, i.e. the pull-in and track behavior, using the above-described iteration algorithm for a typical location packet. In graph 700, the PRN code is the 1023 chip GPS gold code and the location packet has a −95 dBm signal strength. As noted above, each epoch period for this PRN code is 100 us. In one embodiment, 10 iterations can be tried within each epoch period. FIG. 7 shows that the iterations in the first epoch period effectively complete the code phase pull-in (indeed, only 5 iterations result in approximately zero code phase errors). Note that the slight code phase offsets between different epoch periods (e.g. at 10-11 iteration and 30-31 iterations) are due to the uncorrelated noise.

Figure 8:
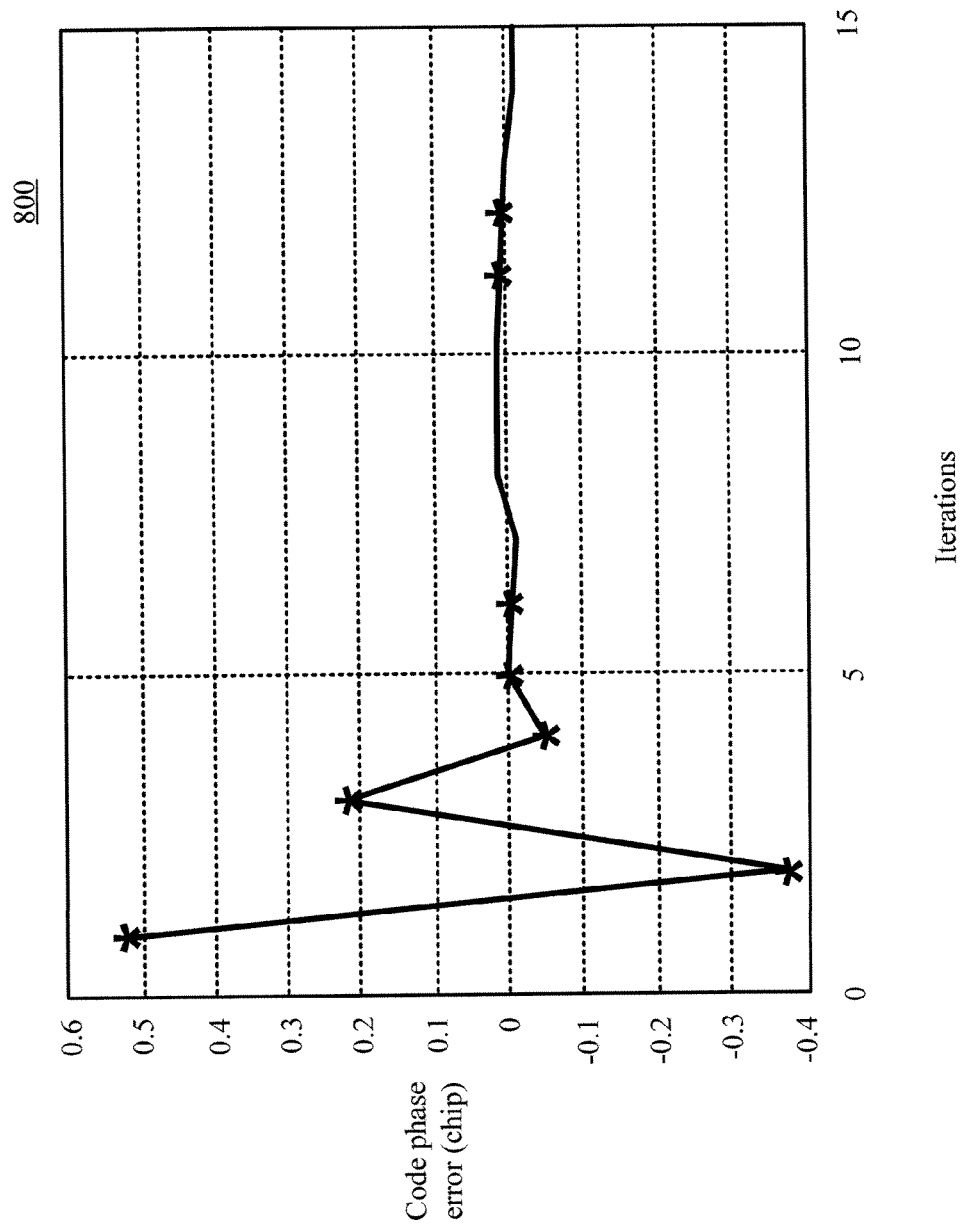
FIG. 8 illustrates how iteration times for effective pull-in and tracking operation of the location packet can be optimized by using only a predetermined number of iterations.

In one embodiment, the iteration times for effective pull-in and tracking operation of the location packet can be optimized by using only a predetermined number of iterations. For example, as shown in FIG. 8, 6 iterations (shown by an "*") can be taken in the first epoch period (1-10 iterations) and 2 iterations can be taken in each subsequent epoch period (½ epoch, 10-15 iterations shown for simplicity).

When there are several epoch signals available, a window average can be taken of their code phase estimates (e.g. using end-point values, which occur at the beginning and end of each epoch) to further enhance the estimation performance.

Simulations confirm the increased accuracy of distance measurement performance using the location packet over conventional and known techniques. The results of exemplary simulations, i.e. the tracking performance, are provided in Table 1 below. These simulations have used a line of sight (LOS) only channel and assumed a weak WIFI signal strength at −95 dBm, no clock frequency error at both transceivers, and signal length multiples of 100 us. Note that the 1023 chip code has a signal-to-noise ratio (SNR) of 35 dB at the epoch sampling (100 us) and the 127 chip code has an SNR of 25 dB at the epoch sampling (10 us).

TABLE 1

WIFI DSSS distance measurement performance in LOS channel

| Tracking Error RMS (m) | Signal Length 100 us | Signal Length 200 us | Signal Length 400 us |
|---|---|---|---|
| 1023 chip code | 0.25 | 0.18 | 0.12 |
| 127 chip code | 0.24 | 0.17 | 0.12 |

Figure 9A:
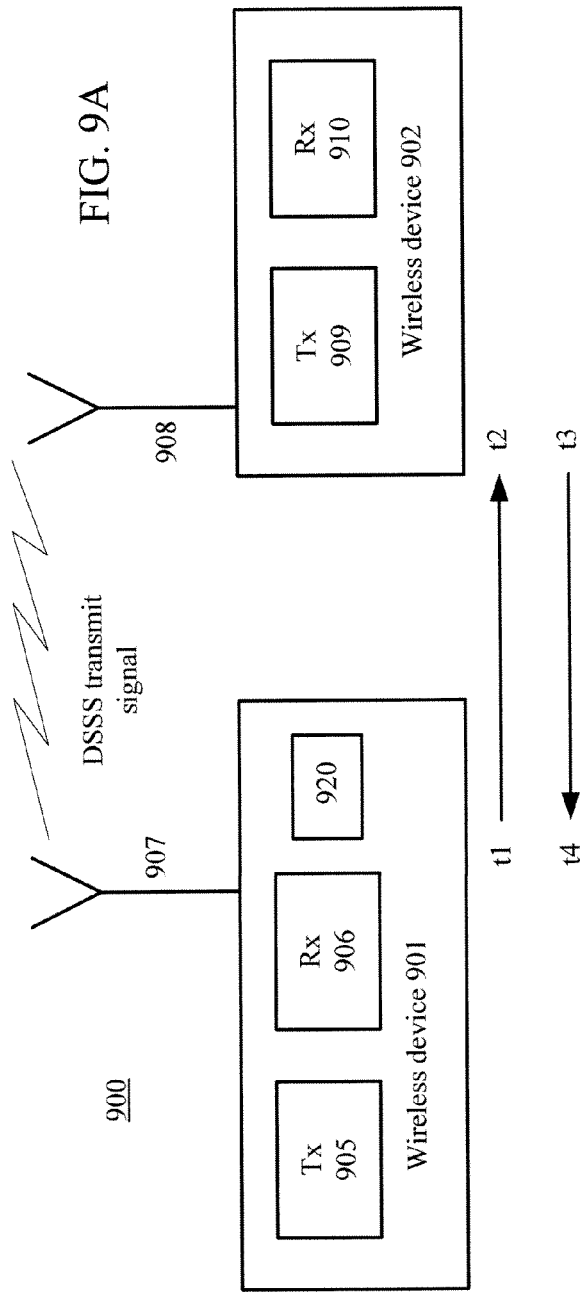
FIGS. 9A and 9B illustrate a technique for computing an effective round-trip time in a WLAN communication system including a wireless device and an access point.

As indicated above, the distance between wireless stations can be determined based on the time for a packet to travel between those stations. To obtain this travel time, a roundtrip time is first determined. For example, FIG. 9A illustrates a simple wireless communication system 900 capable of determining distance between wireless devices. System 900 can include a plurality of wireless devices, e.g. for simplicity, a wireless device 901 and a wireless device 902. Note that in one embodiment, wireless device 901 is a user mobile device and wireless device 902 is an access point, although other implementations are within the scope of the invention.

Wireless device 901 has a transceiver including a transmitter 905, a receiver 906, and an antenna 907. In one embodiment, transmitter 905 can include a first transmitting portion for filtering and modulating the PRN code to form the location symbol. An exemplary first transmitting portion is described above in reference to FIG. 5A. A second transmitting portion (using standard components, therefore not shown) in the transmitter can place the location symbol in the DATA field of the legacy wireless packet to form the location packet. Antenna 907 can transmit the location packet to the second wireless device, e.g. wireless device 902.

Antenna 907 can also receive a second location packet from wireless device 902, wherein the second location packet is substantially identical to the first location packet. Wireless device 901 also includes a receiver 906, in part for processing of the second location signal. Receiver 906 can include first and second receiving portions as well as a processor. The first receiving portion (using standard components, therefore not shown) can separate the location symbol from the second location packet. The second receiving portion can filter and demodulate the location symbol, as well as track the PRN code associated with the location symbol. An exemplary second receiving portion is described above in reference to FIG. 5B.

A processor 920 in wireless device 901 can be configured to determine the effective roundtrip time of the location packet between wireless devices 901 and 902 based on the first and second location packets. Note that because the second location packet is substantially identical to the first location packet, an "effective" roundtrip time for a location packet set (in this case, including a first location packet and a second location packet) can be determined. Processor 901 can also be configured to compute the distance between wireless devices 901 and 902 using the effective roundtrip time. Notably, when wireless device 901 is able to communicate with multiple APs (e.g. at least three APs) having configurations similar to that of wireless device 902 and known locations, wireless device 901 is able to determine its own location. Determining this location can be done by using the known positions and the relative distances from each of the known positions.

For example, using an approximate weighted position solution, if the first known position is (x1, y1, z1) and the first relative position is r1, the second known position is (x2, y2, z2) and the second relative position is r2, and the third known position is (x3, y3, z3) and the third relative position is r3, then computing the coordinate position includes using a set of equations:

$$x0=(w1*x1)+(w2*x2)+(w3*x3),$$

$$y0=(w1*y1)+(w2*y2)+(w3*y3), \text{ and}$$

$$z0=(w1*z1)+(w2*z2)+(w3*z3),$$

wherein $$w1=(1/r1)/(1/r1+1/r2+1/r3),$$

$$w2=(1/r2)/(1/r1+1/r2+1/r3), \text{ and}$$

$$w3=(1/r3)/(1/r1+1/r2+1/r3).$$

Note that other methods of computing position may include the well known Least Square algorithm.

Note that wireless device 902 also includes a transceiver comprising a transmitter 909, a receiver 910, and an antenna 908. In one embodiment, wireless device 902 may have a similar configuration to that described for wireless device 901. In another embodiment, wireless device 902 may have a different configuration from that described for wireless device 901.

To determine location, wireless device 901 can send a first location packet at time t1. Once the first location packet is received by wireless device 902 at time t2, it sends the second location packet (wherein the second location packet is substantially identical to the first location packet) back to wireless device 901 at time t3. Wireless device 901 receives the second location packet at time t4.

Figure 9B:
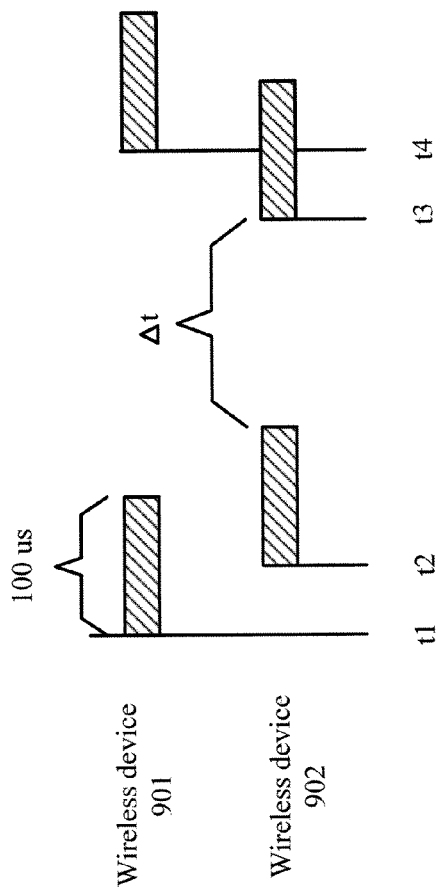

FIG. 9B illustrates the various known times at wireless device 901 and wireless device 902 on a common timeline. As noted above, one exemplary location packet (shown as a rectangular box with a fill pattern) is 100 us long and AP 902 must take some time Δt after processing that signal before the second location packet can be sent back to wireless device 901. The processing times at wireless devices 901 and 902 are known and are based on the signal length. Therefore, an approximate time between wireless devices 901 and 902 can be represented as: (t4−t1−100 us−Δt)/2. Note that times t2 and t3 are sent with the second location packet, which is transmitted from wireless device 902 to wireless device 901.

Note that clock drift between wireless devices 901 and 902 should also be taken into account for increased accuracy. A typical clock offset could be up to 20 ppm, which would result in a distance error of 1.2 m if T1 and T4 are apart by 200 us (e.g. 200 us×20 ppm=4 ns). Therefore, in accordance with one embodiment providing optimized accuracy, the ppm offset should be calibrated so that the residual error is on the order of 1-2 ppm.

In one embodiment, the clock offset can be calibrated to reduce distance computation error. For example, assume that wireless device 901 has a GPS feature, whereas wireless device 902 is an access point. A GPS receiver has an accurate 1 PPS (pulse per second) time source locked to the GPS satellite. By counting the number of local clock cycles in between two PPS ticks, the true frequency of the local clock and its ppm offset can be estimated from the nominal value for wireless device 901. Wireless device 901 can get a precise time stamp from received GPS signals, then correct its crystal frequency offset. Then, wireless device 901 can measure the frequency offset between itself and wireless device 902. Because the crystal frequency offset is proportional to received carrier frequency offset, i.e. ppm=Δf/fc, wireless device 901 knows the clock offset from itself to wireless device 902.

Accurate travel time between WIFI apparatuses (e.g. wireless devices 901 and 902, FIG. 9A) is dependent on a strong correlation peak of the received signal. Notably, location packets have well-defined correlation peaks, as shown in FIGS. 3 and 4.

Note that an acknowledgement (ACK) signal is sent to wireless device 901 before the second location packet is returned at time t3. Therefore, in one embodiment, wireless device 901 can be configured to ignore the ACK signal associated with the first location packet sent at time t1, thereby ensuring that the time t4 (i.e. when the second location packet is received) is accurately determined.

Certain aspects of computing the distance between wireless apparatuses can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of microcontrollers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Figure 10:
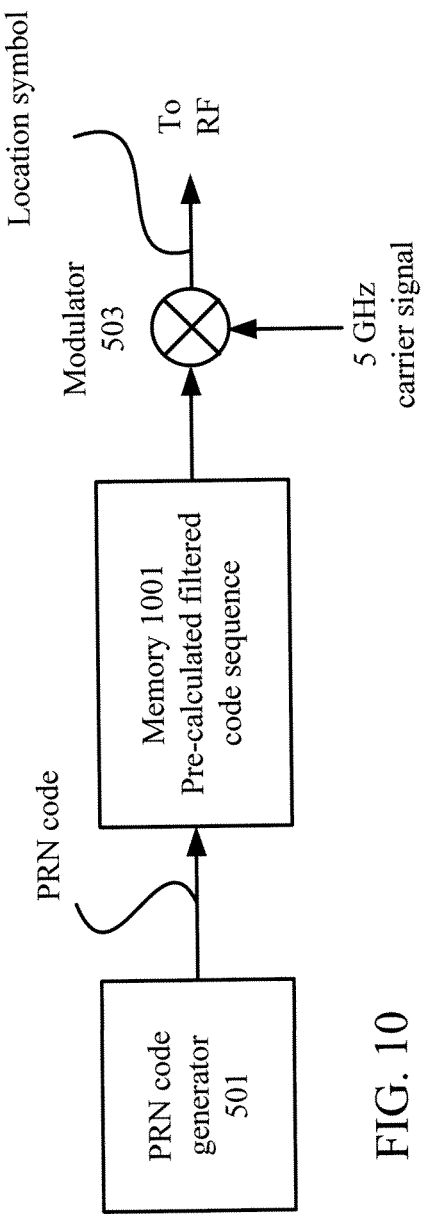
FIG. 10 illustrates a portion of another exemplary transmitter configured to generate the location packet.

The embodiments described herein are not intended to be exhaustive or to limit the invention to the precise forms disclosed. As such, many modifications and variations will be apparent. For example, in one embodiment, a search engine with code phase and frequency offset can achieve the same purpose of tracker 520. In one embodiment shown in FIG. 10, low pass filter 502 (FIG. 5A) for channel spectrum masking can be replaced with a memory 1001 that can store multiple pre-calculated filtered code sequences. In this configuration, the transmitter can access an appropriate pre-calculated filtered code sequence based on the pseudorandom (PRN) code received as input (e.g. a look-up table) and then modulate the pre-calculated filtered code sequence to form the location symbol. Accordingly, it is intended that the scope of the invention be defined by the following Claims and their equivalents.

The invention claimed is:

1. A method of determining a distance between a first wireless device and a second wireless device, the method comprising:
generating a location symbol by filtering a pseudorandom (PRN) code to conform with a predetermined transmit spectral mask, and modulating the filtered PRN code;
providing the location symbol in a data field of a legacy wireless packet to form a first location packet;
transmitting the first location packet from the first wireless device to the second wireless device, then transmitting a second location packet from the second wireless device to the first wireless device, wherein the first and second location packets have power spectrums within the predetermined transmit spectral mask;
determining a roundtrip time between the first and second wireless devices based on the first and second location packets; and
computing the distance between the first and second wireless devices using the determined roundtrip time.

2. The method of claim 1, wherein the PRN code is a GPS 1023 chip code.

3. The method of claim 1, wherein the PRN code is an m-sequence 127 chip code.

4. The method of claim 1, wherein the PRN code has a well-defined autocorrelation function.

5. The method of claim 1, wherein the predetermined transmit spectral mask is for a 40 MHz channel.

6. The method of claim 1, wherein the predetermined transmit spectral mask is for an IEEE 802.11n-compliant channel.

7. The method of claim 1, further including specifying a protocol for the first and second wireless devices, the protocol providing that one predetermined bit of a signal field of the legacy wireless packet indicates the data field includes the location symbol.

8. The method of claim 1, further including specifying a protocol for the first and second wireless devices, the protocol providing that one or more predetermined bits of the data field indicate that the data field also includes the location symbol.

9. The method of claim 1, wherein generating the location symbol includes generating chips of the PRN code using a maximum length shift register (MLSR).

10. The method of claim 1, wherein the second location packet is identical to the first location packet.

11. A transceiver in a first wireless device for determining a distance between the first wireless device and a second wireless device, the transceiver comprising:
- a transmitter comprising:
  - a first transmitting portion coupled to receive a pseudo-random (PRN) code, and in response, provide a filtered PRN code that conforms with a predetermined transmit spectral mask, and modulate the filtered PRN code to form a location symbol; and
  - a second transmitting portion for providing the location symbol in a data field of a legacy wireless packet to form a first location packet;
- an antenna for transmitting the first location packet to the second wireless device; and
- a receiver comprising:
  - a first receiving portion for separating the location symbol from a second location packet received by the antenna from the second wireless device;
  - a second receiving portion for bandpass filtering the location symbol separated from the second location packet, demodulating the bandpass filtered location symbol, and tracking the PRN code within the demodulated and bandpass filtered location symbol; and
  - a processor configured to:
    - determine a roundtrip time between the first and second wireless devices based on the first and second location packets using outputs of the second receiving portion; and
    - compute the distance between the first and second wireless devices using the roundtrip time.

12. The transceiver of claim 11, wherein the transmitter further includes a PRN code generator that generates the PRN code.

13. The transceiver of claim 12, wherein the PRN code generator generates a GPS 1023 chip code.

14. The transceiver of claim 12, wherein the PRN code generator generates an m-sequence 127 chip code.

15. The transceiver of claim 11, wherein the first transmitting portion includes a low pass filter that filters the PRN code to provide the filtered PRN code.

16. The transceiver of claim 11, wherein the first transmitting portion includes a modulator for modulating the filtered PRN code onto a 5 GHz carrier to form the location symbol.

17. The transceiver of claim 11, wherein the second receiving portion includes a demodulator for demodulating the bandpass filtered location symbol with a 5 GHz carrier downconverter signal.

18. The transceiver of claim 17, wherein the second receiving portion includes a data bit removal block for extracting the PRN code from an output of the demodulator.

19. The transceiver of claim 18, wherein the second receiving portion includes a correlator dump block for receiving the PRN code and generating N (noise), E (early), P (prompt), and L (late) correlation results for use in code and frequency tracking.

20. The transceiver of claim 19, wherein the second receiving portion includes a code and frequency tracking block for receiving an output of the correlator dump block and providing outputs to a PRN mixer and a carrier removal block.

21. The transceiver of claim 20, wherein the code and frequency tracking block performs multiple iterations within at least one epoch period of the PRN code.

22. The transceiver of claim 11, wherein the second location packet is identical to the first location packet.

23. The transceiver of claim 11, wherein the first transmitting portion comprises a memory coupled to receive the PRN code, wherein the memory provides a pre-calculated filtered code sequence as the filtered PRN code in response to the PRN code.

24. A wireless communication system comprising:
- a wireless device; and
- a plurality of located wireless devices, each located wireless device having a known location,
- wherein the wireless device is configured to determine a distance between itself and each located wireless device using a method comprising:
  - generating a location symbol by filtering a pseudorandom (PRN) code to conform with a predetermined transmit spectral mask, and modulating the filtered PRN code;
  - providing the location symbol in a data field of a legacy wireless packet to form a first location packet;
  - transmitting the first location packet from the wireless device to the located wireless device, then transmitting a second location packet from the located wireless device to the wireless device, wherein the first and second location packets have power spectrums within the predetermined transmit spectral mask;
  - determining a roundtrip time between the wireless device and the located wireless device based on the first and second location packets; and
  - computing the distance between the wireless device and the located wireless device using the determined roundtrip time, and
- wherein the wireless device is further configured to determine its location based on computed distances from the wireless device to the plurality of located wireless devices.

25. The wireless communication system of claim 24, wherein the second location packet is identical to the first location packet.

26. The wireless communication system of claim 24, wherein at least one of the located wireless devices is an access point (AP).

* * * * *